Aug. 16, 1949.　　　　W. D. ALLEN　　　　2,479,288
FLEXIBLE ELECTROMAGNETIC WAVE GUIDE
Filed Feb. 28, 1946　　　　2 Sheets-Sheet 1

INVENTOR
WILLIAM DOUGLAS ALLEN
BY
Cushman, Darby & Cushman
ATTORNEYS

Aug. 16, 1949.  W. D. ALLEN  2,479,288
FLEXIBLE ELECTROMAGNETIC WAVE GUIDE
Filed Feb. 28, 1946  2 Sheets-Sheet 2

Inventor
William D. Allen
By Cushman, Darby & Cushman
Attorneys

Patented Aug. 16, 1949

2,479,288

UNITED STATES PATENT OFFICE 2,479,288

FLEXIBLE ELECTROMAGNETIC WAVE GUIDE

William Douglas Allen, Malvern, England

Application February 28, 1946, Serial No. 650,995
In Great Britain March 8, 1944

Section 1, Public Law 690, August 8, 1946
Patent expires March 8, 1964

10 Claims. (Cl. 178—44)

This invention relates to electro-magnetic wave guides and it has for its main object to provide a wave guide which, though robust enough to stand handling and mounting, is also capable of a substantial degree of bending or twisting without unduly upsetting the characteristics of the guide due to a change in the cross-section of the sheath, i. e. the wall defining the guide.

According to the invention this object is attained by making the sheath of the wave guide of wire mesh and surrounding it by a sleeve of flexible material such as rubber which conforms to the sheath and to which the sheath is secured. The rubber or other flexible material is preferably moulded on to the wire-mesh sheath or bonded to it by one of the processes now practised commercially for securing such materials to metal. Such a wave guide may be twisted or bent without the cross-section of the sheath being effectively altered. The section may change slightly but the provision of a sleeve of flexible material of adequate thickness ensures that the change will be gradual and thus "tapered." If ordinary wire-mesh is employed in which the wires are at right angles to one another, bending is facilitated if the wires are arranged on the bias, e. g. 45°, with respect to the longitudinal axis of the guide; twisting is facilitated if the two sets of wires are respectively arranged parallel and at right angles to that axis.

Sections of wave guide made according to the invention are suitable for interposing between pieces of apparatus, or lengths of rigid wave guide, between which relative motion is necessary, as when high-frequency energy has to be supplied to a radiator which is mechanically oscillated. They may also be employed with advantage where vibration is likely to occur, as in mobile equipment.

The invention will now be described in greater detail with reference to the accompanying drawings which illustrate by way of example one form of wave guide coupling made in accordance with it. In these drawings—

Figure 2:
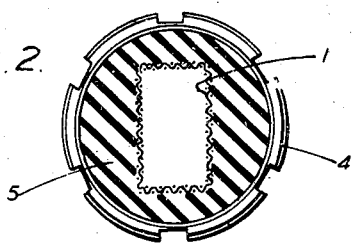
Figures 2 and 3 are transverse sections on the lines II—II and III—III respectively of Figure 1.

Referring to these drawings, 1 indicates the hollow tubular sheath of the guide. It is made of copper wire-mesh having from 70 to 80 wires to the inch. In the example illustrated it is of rectangular cross-section but, obviously, it may be of other polygonal cross-section or of circular or oval cross-section. It is to be understood that the terms "tube" and "tubular" as used in the specification and claims are intended to include hollow structures having either substantially polygonal or circular or oval cross-sections. It is formed by wrapping an appropriately-dimensioned sheet of wire-mesh round a mandrel and soldering the edges. The mandrel has the form of an anodized Duralumin bar having a transverse section of the same dimensions as the inside of the sheath. The mandrel has been omitted from the drawing for the sake of clarity. It would extend beyond the wire-mesh sheath at each end and have its longitudinal edges slightly rounded.

Figure 4:
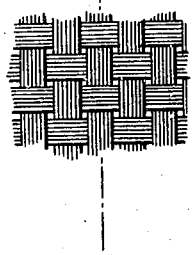
Figures 4 and 5 show details of the wire mesh of which the sheath is made.
Figure 5:

The wire mesh may be arranged with the two sets of component wires arranged respectively parallel with and at right angles to the longitudinal axis of the guide, as shown in Fig. 4 in which the broken line indicates the direction of the axis. Alternatively, the wires may be arranged on the bias as shown in Fig. 5.

A short length of copper tube 2, of rectangular cross-section, fits over each end of the sheath 1. This tube 2 may be made from a piece of sheet copper bent round the wire-mesh sheath 1 on the mandrel.

A brass washer 3 is put on each piece of tube 2 and then a male or female coupling member 4. These have central rectangular openings fitting the outside of the tube.

The outer faces or ends of sheath 1, tube 2, and coupling member 4 are brought flush, and the coupling member sweated to the tube 2, and the tube 2 to the sheath 1. Each washer 3 is sweated to the tube 2 in the position shown.

The sheath 1, and the inner ends of the tubes 2 between the washers 3, are then surrounded by a substantial sleeve 5 of rubber. The rubber is moulded into the space between the washers 3 and on to the sheath 1 which is thus secured to the rubber over the whole of its area. The rubber is also caused to adhere to the inner faces of the washers 3. It hardness, measured by a Dunlop durometer, may be from 35 to 40. The outer surface of the rubber sleeve is given a cylindrical form.

Figure 8:
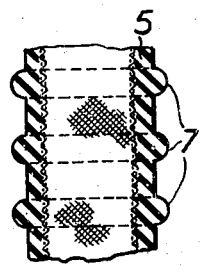
Figures 6 to 14 show various forms of the flexible sleeve of the guide.
Figure 7:
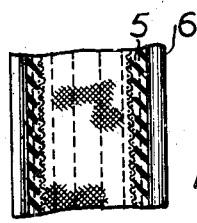
Figure 11:
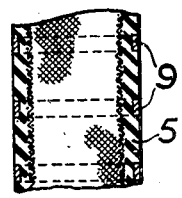
Figure 6:
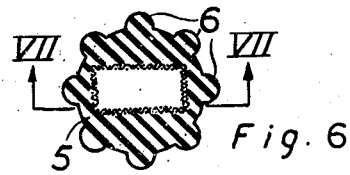
Figure 9:
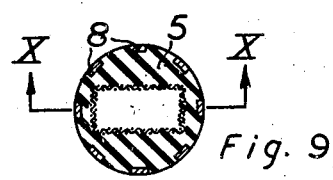
Figure 10:
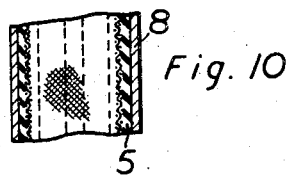

The invention is applicable to wave guides having a cross-section other than the rectangular form described with reference to the drawing. Moreover, the flexible sleeve need not be of cylindrical form nor need it be of uniform thickness as in the example illustrated. It may have longitudinal or transverse slots or grooves so as to produce in effect a thinner sleeve strengthened by longitudinal or transverse ribs. Such arrangements are illustrated in Figs. 6, 7 and 8. In Fig. 6, the sleeve 5 is provided with longitudinal ribs 6. Fig. 7 is a section of Fig. 6 on the line VII—VII. In Fig. 8, the sleeve 5 is provided with transverse ribs 7. Strips of metal may be embedded in the flexible material of the sleeve to re-inforce it. Such arrangements are illustrated in Figs. 9, 10 and 11. In Fig. 9, the sleeve 5 is re-inforced with longitudinal strips of metal 8. Fig. 10 is a section of Fig. 9 on the lines X—X. In Fig. 11, the sleeve 5 is re-inforced with transverse strips of metal 9.

Figure 12:
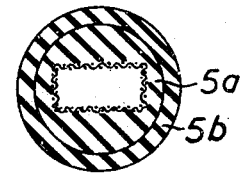
Figure 13:
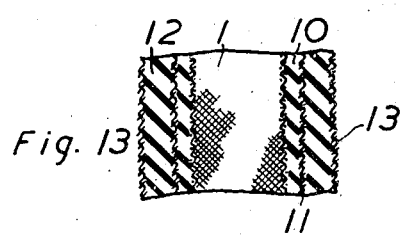

The sleeve may be of composite construction instead of in one piece. It may be built up of two or more concentric sleeves the material of which need not all be of the same flexibility, as shown in Fig. 12 in which the sleeve is made up of two layers 5a and 5b. In one form of composite construction, as shown in Fig. 13, the wire-mesh sheath may have a coating of rubber 10 bonded to it, a layer of fabric 11 over the rubber coating, and a thick rubber sleeve 12 over the fabric.

Figure 1:
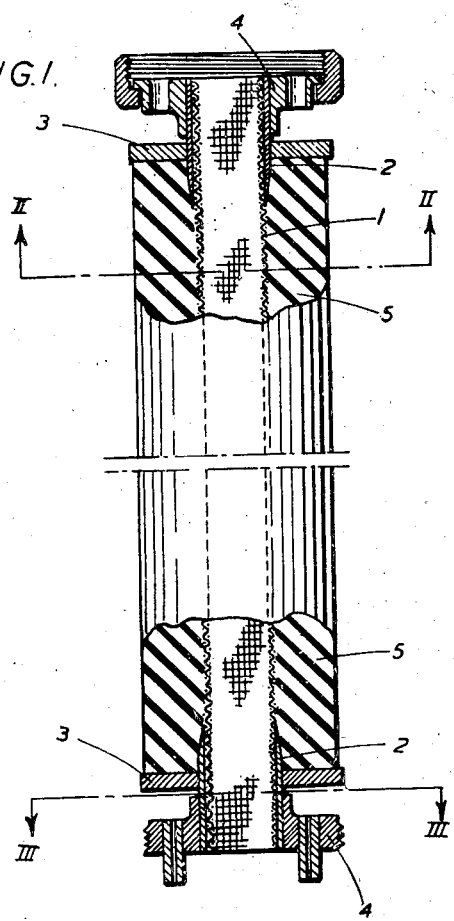
Figure 1 is a longitudinal section through the guide.
Figure 3:
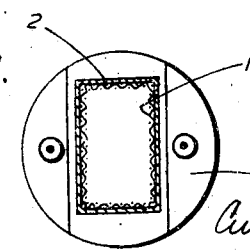

It is not desired that the wave guide should twist, its resistance to twisting may be increased by providing a sleeve of braid 13 over the outside of the flexible sleeve. The braid sleeve may, in a wave guide such as that illustrated in Fig. 1, extend between two collars which cover the junctions between the wire-mesh sheath and the end tubes.

Figure 14:
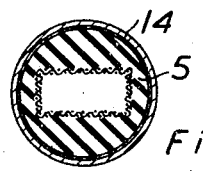

Resistance to bending may be increased by putting a rigid tube 14 over the flexible sleeve 5, as shown in Fig. 14.

I claim:

1. An electromagnetic wave guide comprising an innermost hollow tube formed of conducting wire mesh, and a flexible sleeve surrounding and secured to said tube, the interior of said tube being devoid of all matter except air whereby the sole dielectric within the tube is an air core of high power factor.

2. An electromagnetic wave guide comprising an innermost hollow tube formed of conducting wire mesh, and a sleeve of flexible material surrounding and secured to said tube for supporting the same and substantially maintaining the original cross-section of the tube when the wave guide is subjected to flexural or torsional stress, the interior of said tube being devoid of other supporting means whereby the sole dielectric within the tube is an air core of high power factor.

3. An electromagnetic wave guide comprising an innermost hollow tube formed of conducting wire mesh, and a rubber sleeve surrounding and bonded to said tube for supporting the same and substantially maintaining the original cross-section of the tube when the wave guide is subjected to flexural or torsional stress, the interior of said tube being devoid of other supporting means whereby the sole dielectric within the tube is an air core of high power factor and of a cross-sectional area substantially equal to the cross-sectional area enclosed by the tube.

4. The combination set forth in claim 2 wherein the wires of the mesh are arranged on the bias with respect to the longitudinal axis of the tube.

5. The combination set forth in claim 3 wherein the wires of the mesh are arranged on the bias with respect to the longitudinal axis of the tube.

6. The combination set forth in claim 3 wherein the wire mesh comprises two sets of wires which are respectively at right angles and parallel to the longitudinal axis of the tube.

7. The combination set forth in claim 2 wherein the flexible sleeve is provided with ribs extending longitudinal to the axis of the wave guide and projecting outwardly from the exterior surface of the sleeve.

8. The combination set forth in claim 3 wherein the rubber sleeve is provided with ribs extending longitudinal to the axis of the wave guide and projecting outwardly from the exterior surface of the sleeve.

9. The combination set forth in claim 2 wherein the flexible sleeve is provided with ribs extending transverse to the axis of the wave guide and projecting outwardly from the exterior surface of the sleeve.

10. The combination set forth in claim 3 wherein the rubber sleeve is provided with ribs extending transverse to the axis of the wave guide and projecting outwardly from the exterior surface of the sleeve.

WILLIAM DOUGLAS ALLEN.

REFERENCES CITED

The following references are of record in the file of this patent:

UNITED STATES PATENTS

| Number | Name | Date |
| --- | --- | --- |
| 2,193,017 | Bassett | Mar. 12, 1940 |
| 2,287,134 | Robertson | June 23, 1942 |
| 2,342,736 | Herzog | Feb. 29, 1944 |
| 2,374,498 | Quayle | Apr. 24, 1945 |
| 2,387,783 | Tawney | Oct. 30, 1945 |
| 2,436,421 | Cork | Feb. 24, 1948 |